March 22, 1932.    C. W. WEISS    1,850,189
TRANSMISSION DEVICE
Filed July 16, 1930    5 Sheets-Sheet 1

Inventor
Carl W. Weiss
By his Attorneys
Redding, Greeley, O'Shea & Campbell

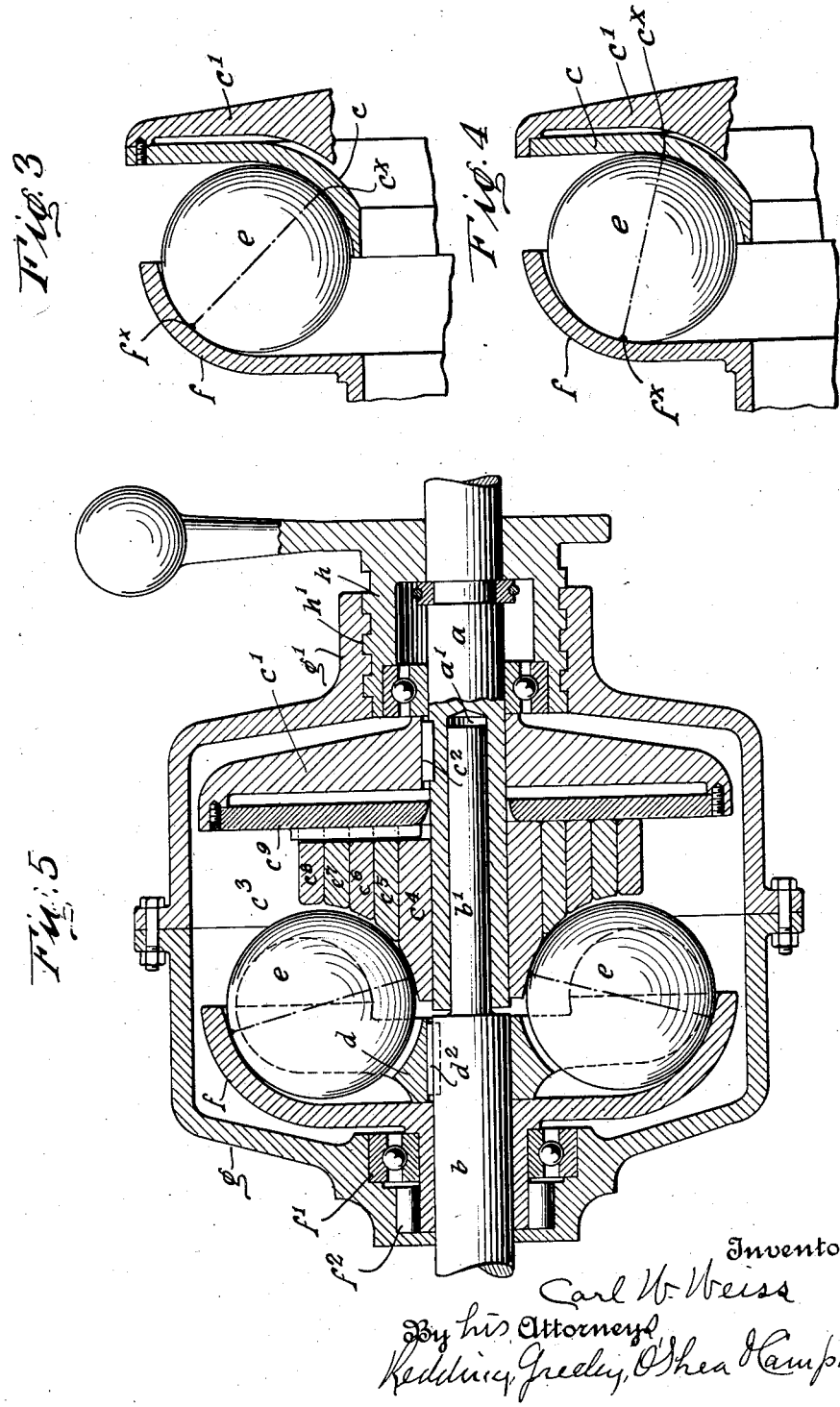

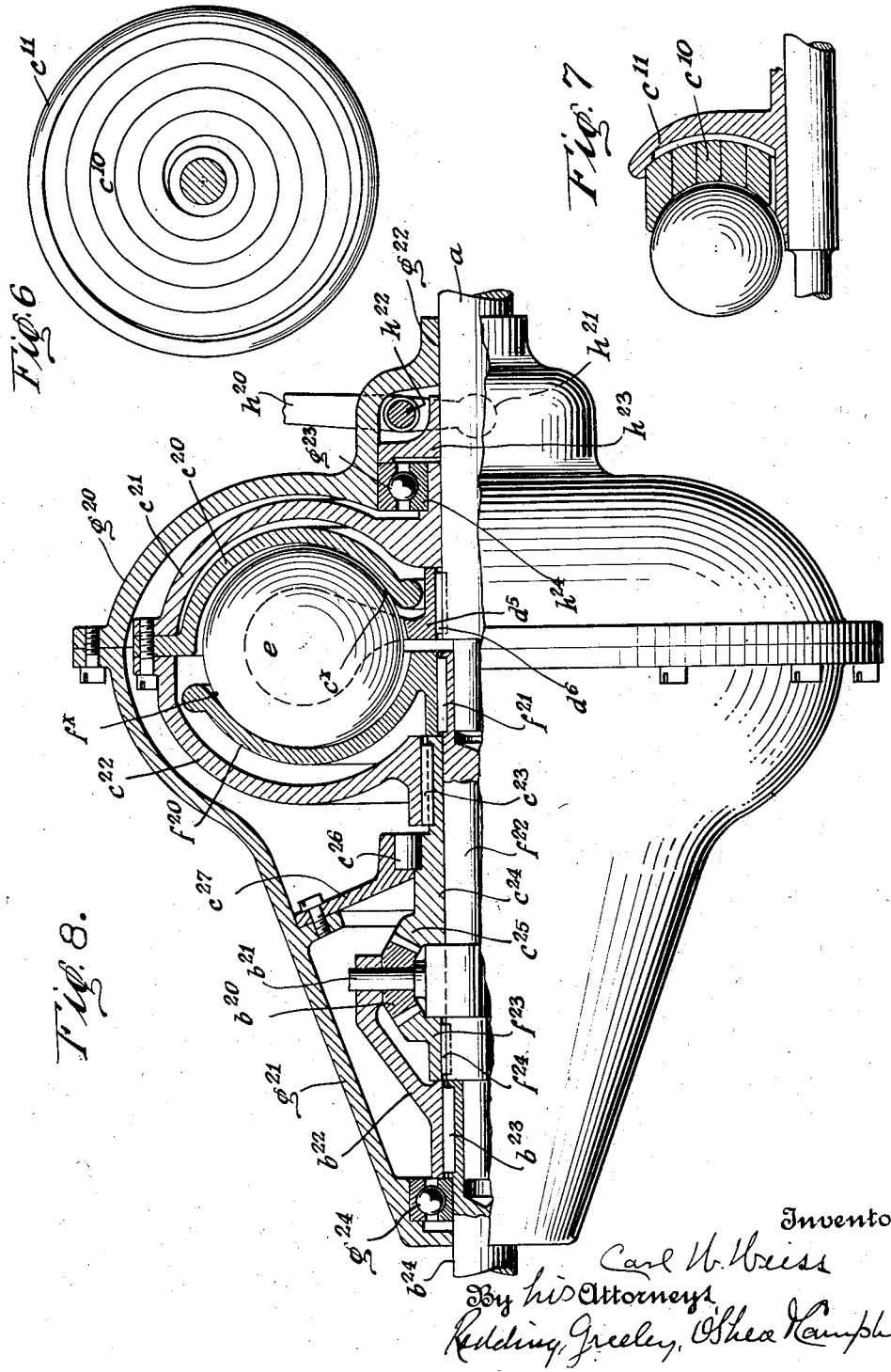

March 22, 1932. C. W. WEISS 1,850,189
TRANSMISSION DEVICE
Filed July 16, 1930 5 Sheets-Sheet 4
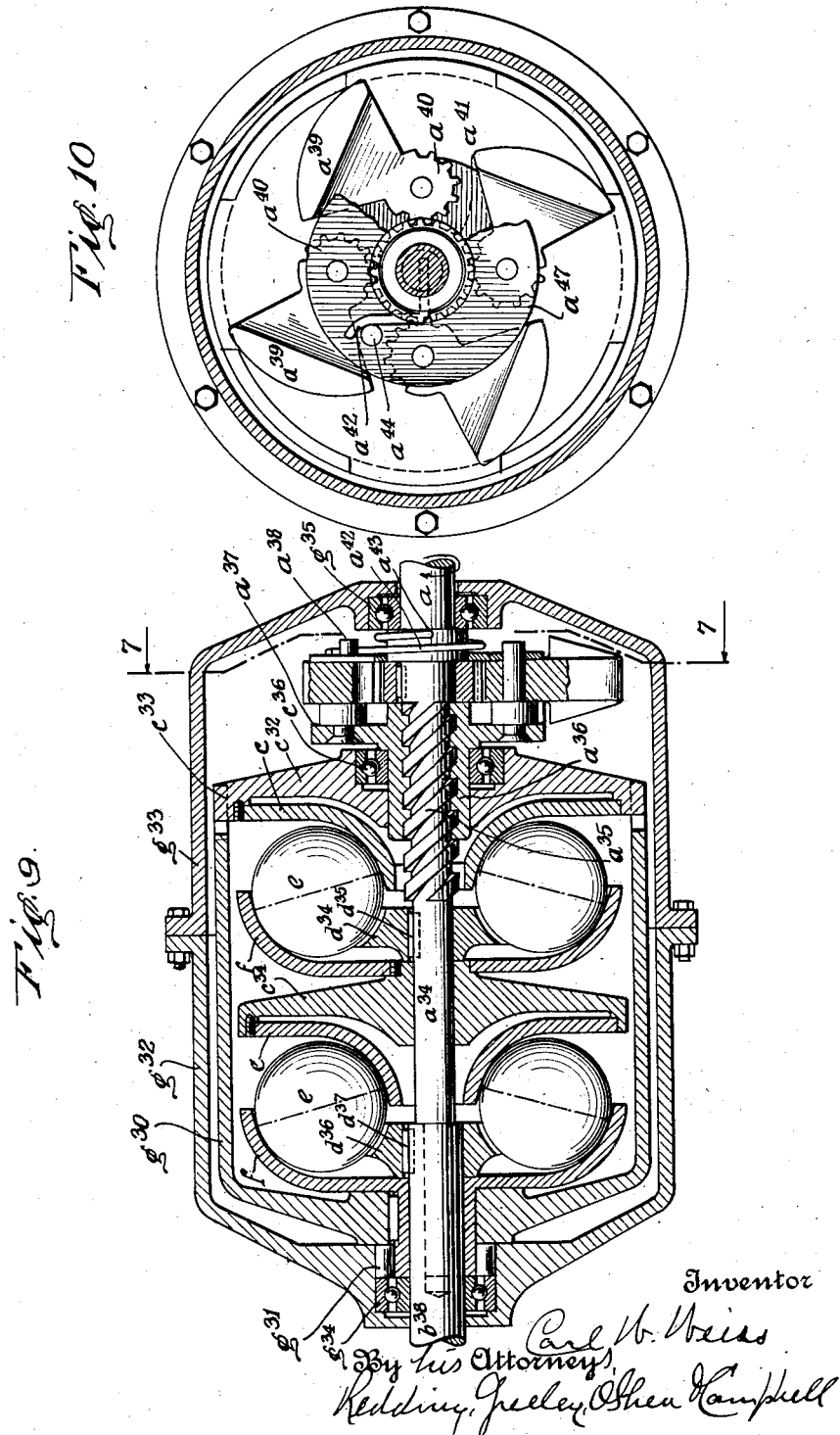

March 22, 1932.  C. W. WEISS  1,850,189
TRANSMISSION DEVICE
Filed July 16, 1930   5 Sheets-Sheet 5

Inventor
Carl W. Weiss
By his Attorneys
Redding, Greeley, O'Shea & Campbell

Patented Mar. 22, 1932

1,850,189

UNITED STATES PATENT OFFICE

CARL W. WEISS, OF BROOKLYN, NEW YORK

TRANSMISSION DEVICE

Application filed July 16, 1930. Serial No. 468,318.

The object of this invention is to produce an improved device for the transmission of power from a driving member to a driven member in which the speed at which power is transmitted shall be variable at will between zero or a predetermined minimum and a 1:1 ratio as between the driving member and the driven member. The improved device is in the nature of an epicyclic train, power being transmitted from a driving element to a driven element through the medium of a rotatable ball carrier and a ball or balls which at all times has or have rolling contact in circumferential lines with concave members, at least one of which is yieldable so that the circumferential lines of contact of the balls with the concave members may be shifted to effect the desired change of speed without sliding as between the ball or balls and said members. One of such concave members serves as a reaction device, being held from rotation in at least one direction, and the other of such concave members or the ball carrier is rotated under the influence of driving power which is applied to the device and from one or the other power is transmitted to the driven part.

The invention will be more fully explained with reference to the accompanying drawings in which several practical embodiments are illustrated, and in which:

Figures 3 and 4 are detail views showing one of the balls and the cooperating concave members in the different relations which they may occupy at different speeds.

Figure 5 is a view similar to Figure 1, but showing a slightly different construction of one of the concave members.

Figures 6 and 7 are detail views illustrating still another form of one of the concave members.

Figure 8 is a view, partly in elevation and partly in longitudinal section, illustrating still another embodiment of the invention.

Figure 9 is a view, partly in elevation and partly in longitudinal section, showing a structure in which two single transmission devices, such as that shown in Figure 1, are compounded and in which a torque control means is combined with the compound transmission mechanism.

Figure 10 is a view in end elevation as seen from the right hand in Figure 9, the outer housing being removed.

Figure 2:
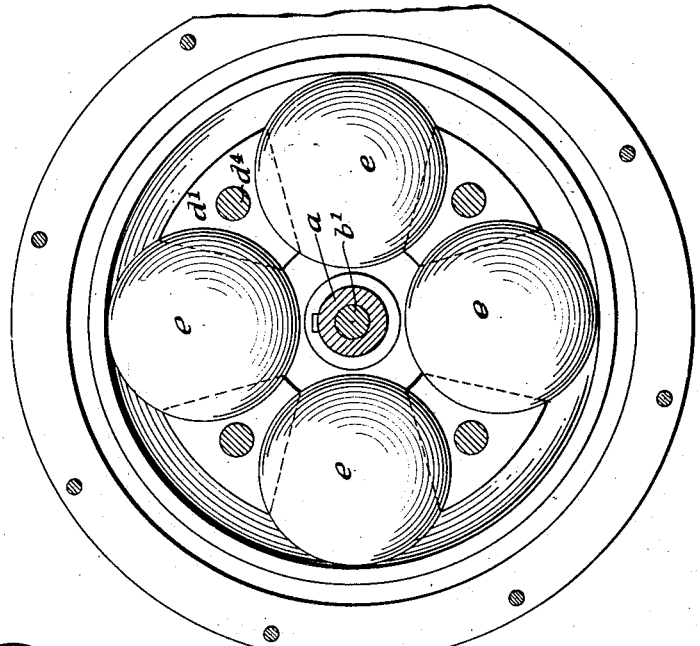
Figure 2 is a view of the same in transverse sectional elevation, the plane of section being indicated by the broken line 2—2 of Figure 1.
Figure 1:
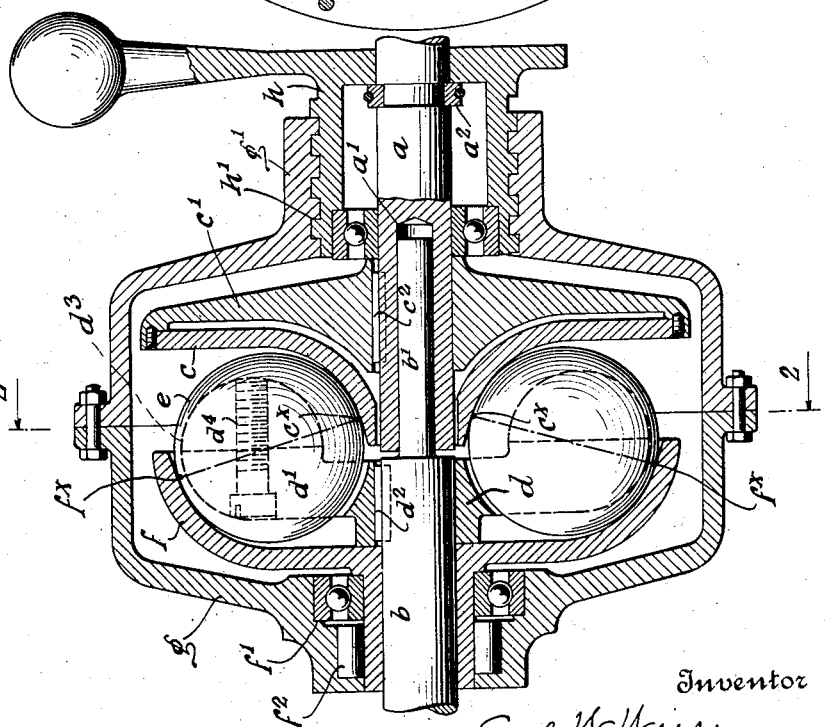
Figure 1 is a view in longitudinal sectional elevation of one of such embodiments of the invention.

In the embodiment of the invention illustrated in Figures 1 and 2 the part through which power is supplied is shown as a shaft $a$ and the driven part to which power is to be transmitted at a variable speed is shown as a shaft $b$. The shaft $b$ is shown as having a reduced portion $b^1$ received with a running fit within the bore $a^1$ of the shaft $a$ for the purpose of securing alignment of the two shafts. Secured to the shaft $a$, so as to rotate therewith, is a concave annular member $c$ which is capable of yielding, in this instance, in an axial direction for a purpose to be explained. In this embodiment of the invention the concave member $c$ is formed as a plate which, though heavy enough for the transmission of power, nevertheless itself has some degree of resilience. It is shown as supported by and secured to a heavier rigid disc or circular plate $c^1$, which is keyed on the shaft $a$, as indicated at $c^2$. A ball carrier $d$, which may be formed in two parts $d^1$ and $d^3$ united by screw bolts $d^4$, is keyed on the shaft $b$, as indicated at $d^2$, so that the shaft shall rotate with the ball carrier. A ball or balls $e$ are supported by the ball carrier for rolling contact with the concave member $c$ on one side and with a similar concave member $f$ on the other side. It will be observed that through this construction, the balls have under all conditions rolling contact with the concave members substantially on circumferential lines (of maximum diameter) and that there is therefore no sliding contact to develop friction, heat and wear. Since the contact points of the balls with the surfaces are substantially on diametrically opposed points on the balls, there is no tendency to cause the balls to slip or be forced over the surfaces in the direction of the axes of rotation thereof. It will be understood, of course, that the points of contact need not be exactly diametrically opposed but may vary within seven degrees (the friction angle) and therefore, as long as the points of contact of the balls are diametrically opposed, or are within the friction angle from diametrical positions, there will be no tendency for sliding friction. The concave member $f$ is mounted with a running fit on the shaft $b$ and, serving as a reaction member, is held from rotation in at least one direction by any suitable means, such as a ball clutch or one-way brake, as indicated at $f^2$, of ordinary construction, which will permit rotation of the member $f$ in one direction, if so desired, but will prevent rotation thereof in the opposite direction, the ball clutch being carried by the housing $g$ which is fixed. A ball bearing may be provided, as at $f^1$, to support the member $f$ for rotation. It will be observed that the arc of curvature of each of the concave members $c$ and $f$ is not struck upon a single center and that the curve center of the member $c$ is above the center of the ball while the curve center of the member $f$ is below the center of the ball. It will also be observed that the radii of curvature of each member $c$ and $f$ are slightly greater than the radius of curvature of the ball. In the relative positions of the parts shown in Figure 1 each ball is assumed to have operative contact with the members $c$ and $f$ at the points $c^x$ and $f^x$, the line joining these points standing at an angle of about 15° with the plane in which the centers of the balls lie. With the parts proportioned about as shown this relation gives the lowest practicable speed ratio between the driving part and the driven part. If the two concave members $c$ and $f$ should be separated further there will be no driving contact of these members with the balls and the member $c$ will run free without transmitting movement to the driven shaft $b$. If, however, the members $c$ and $f$ are moved closer together the members or at least the member $c$ will yield slightly so that the line joining these two points through the ball will be shifted further from the vertical plane to a position of about 45°, as shown in Figure 3, or if the members $c$ and $f$ are pressed still more closely together, the line of contact may be made to approach still more closely to the horizontal plane, as shown in Figure 4. If the lowest practicable speed ratio is attained when the parts are in the positions represented in Figure 1, it will be seen that as the members $c$ and $f$ are pressed more and more closely together, as shown in Figures 3 and 4, the speed ratio of the driving shaft to the driven shaft will be increased until it approaches, in the construction shown, a 2:1 ratio. It will be understood that when the parts are in the positions shown in Figure 1 the balls will be caused to roll each on its own diameter, like an epicyclic gear, at the relatively lowest speed and the ball carrier will then have its relatively lowest speed of rotation, and that as the parts approach the positions in which the line of contact is parallel with the axis of the shafts $a$ and $b$ the ball carrier will have its highest speed of rotation and the speed ratio between the shafts $a$ and $b$ will decrease. As each ball rolls about its own axis, in contact on one side with the rotating member $c$ and on the other side with the stationary member $f$, the ball carrier will rotate about its own axis. The speed ratio of the driving member and the ball carrier will be determined within these limits by the ratio between the diameter $c^x$—$c^x$ of the circular path of contact of the balls $e$ with the member $c$ and the diameter $f^x$—$f^x$ of the circular path of contact of the balls $e$ with the member $f$, the lines of contact of the balls themselves being substantially circumferential, that is, of maximum diameter. If the parts are proportioned and related as shown in Figure 1 these diameters would be in about the ratio of 1:4 and the speed of the driving shaft (member $c$) would be to the speed of the driven shaft (carrier $d$) as 5:1. If the parts are related as shown in Figure 4, in which the diameters $c^x$—$c^x$ and $f^x$—$f^x$ are nearly equal, the ratio of the speed of the driving shaft would be to the speed of the driven shaft a little more than 2:1. In the extreme position, with the axis of rotation of each ball 90° with the shaft axis, the ratio would be 2:1. As a convenient means of effecting relative displacement of the members $c$ and $f$, the shaft $a$, as shown in Figure 1, may be engaged through a split ring $a^2$ by a handled sleeve nut $h$ which has a threaded engagement, as at $h^1$, with a hub $g^1$ of the housing $g$.

In the construction of the ball carrier shown in Figure 2 the balls $e$ rotate in direct contact with the arms of the part $d^1$. To prevent such frictional contact the ball carrier may be formed as shown in Figure 13 in which the part $d^{40}$ of the ball carrier is formed with spindles $d^{41}$ on which are mounted concaved rollers $d^{42}$ with which the balls $e$ have rolling contact.

The construction shown in Figure 5 is in all respects the same as that shown in Figure 1, except as to the formation of the concave member $c$. In the construction shown in Figure 5 the concave member $c^3$ is made up of a series of telescoping sleeves $c^4$, $c^5$, $c^6$, $c^7$ and $c^8$ which are shaped to form a concave surface for coaction with the balls $e$, as before, these sleeves being backed up by a yielding disc $c^9$ secured at its outer periphery to the supporting disc $c^1$. It will be seen that as this composite concave member is pressed toward the corresponding concave member $f$ the line through each ball joining the points of contact of the ball with the concave members will be shifted from the initial position represented in Figure 5 toward a position parallel with the shaft axis.

As shown in Figures 6 and 7 the concave member might be formed of a band $c^{10}$ coiled upon itself and supported by a rigid disc $c^{11}$.

In the construction shown in Figures 1 and 5, four balls equally distributed are shown. It will be understood, however, that any suitable number of balls might be provided and that although it is desirable to employ a plurality of balls it is at least theoretically possible to express the invention in a structure which includes but one ball.

In the structure shown in Figure 8 the essential characteristic of the invention is embodied in a construction which differs somewhat in detail from the constructions shown in Figures 1 and 5, and these details will now be described.

In this construction the driving shaft $a$ has the ball carrier $d^5$ keyed to it, as at $d^6$, the ball carrier being formed and supporting the balls $e$ substantially as already described. The relatively yieldable concave members $c^{20}$ and $f^{20}$ are shaped substantially as already described and for low speed transmission make contact with the balls at the points indicated at $c^x$ and $f^x$. The concave member $c^{20}$ in this instance is held between the two parts $c^{21}$ and $c^{22}$ of a shell to be referred to again. The member $f^{20}$ is keyed, as at $f^{21}$, to an intermediate shaft $f^{22}$ in alignment with the driving shaft $a$. The part $c^{22}$ of the shell $c^{21}$, $c^{22}$, is keyed, as at $c^{23}$, on a sleeve $c^{24}$ which has a running fit on the shaft $f^{22}$, and is formed at its end, as at $c^{25}$, with bevel gear teeth. A bevel gear $f^{23}$ is keyed on the shaft $f^{22}$, as at $f^{24}$, and the two bevel gears $c^{25}$ and $f^{23}$ mesh with intermediate pinions of which one is shown at $b^{20}$, such pinions being carried by spindles $b^{21}$ supported by a shell $b^{22}$ which is keyed, as at $b^{23}$, on the driven shaft $b^{24}$. A two-part housing $g^{20}$, $g^{21}$ has a running fit at $g^{22}$ on the driving shaft $a$ and has a bearing, as at $g^{23}$, on the hub of the shell $c^{21}$ which also has a running fit on the driving shaft $a$. The housing member $g^{21}$ also has a bearing as at $g^{24}$ on the driven shaft $b^{24}$. A ball clutch at $c^{26}$, carried by a web $c^{27}$, secured to the housing member $g^{21}$ serves as a reaction device to prevent rotation of the shell $c^{21}$, $c^{22}$ and the concave member $c^{20}$ in one direction. A control lever $h^{20}$ is so related to the other parts of the device as to effect the movement of the concave members $c^{20}$ and $f^{20}$ toward and from each other. In the construction shown the lever $h^{20}$ is pivoted, as at $h^{22}$, in the housing $g^{20}$ and carries at $h^{21}$ a fork which engages a sleeve $h^{23}$. The latter bears against the ball bearing $g^{23}$ and through the contact of the latter at $h^{24}$ with the inner housing member $c^{21}$ may move the concave member $c^{20}$ so as to shift its line of contact with the balls $e$ as already described with reference to Figure 1. The movement of the part $c^{21}$ carries with it the part $c^{22}$, clearance being left between the hub of the latter and the shoulder of the sleeve $c^{24}$ sufficient to permit such movement.

With the concave members and balls in the relative positions shown in Figure 8, the balls being in contact with the concave members at the points $c^x$ and $f^x$, the balls rotate on an axis at right angles to a line joining the points $c^x$ and $f^x$. The ball carrier rotates with the shaft $a$ and the concave member $f^{20}$ also rotates in the same direction as the driving shaft $a$, as does the shaft $f^{22}$ to which it is keyed, and the bevel gear $f^{23}$, keyed to the shaft $f^{22}$ also rotates in the same direction. With the balls on the surfaces of members $f^{20}$ and $c^{20}$ in the position shown in Figure 8, the torque transmitted to the member $f^{20}$ is greater than that transmitted to the member $c^{20}$ and thus shaft $f^{22}$, and bevel gear $f^{23}$ receive more power than the sleeve $c^{24}$ which is secured to the member $c^{20}$. As the sleeve shaft $c^{24}$ and its bevel gear $c^{25}$ are then held from rotation in the opposite direction by the reaction device $c^{26}$, the pinions $b^{20}$, engaged by the bevel gear $f^{23}$, are caused to roll on the bevel gear $c^{25}$ and therefore to cause rotation of the shell $b^{22}$ and the driven shaft $b^{24}$ in the same direction as the driving shaft $a$ at their slowest speed. The ratio of the speed of rotation of the shaft $b^{24}$ to the speed of rotation of the shaft $f^{22}$ equals the speed of rotation of the shaft $f^{22}$ divided by 2, and the ratio of the speed of the shaft $f^{22}$ to the speed of the driving shaft $a$ is determined, as before, by the ratio of diameters of the paths of contact of the concave members and the balls, subject to the condition that in this case the ball carrier is rotated with the driving shaft. Under these conditions, that is, with the balls in the position shown in Figure 10, the driven part $b^{24}$ will be driven at its lowest practicable speed. A further separation of the members $c^{20}$ and $f^{20}$ will cause the device to idle. On the other hand, the pressing together of the members $c^{20}$ and $f^{20}$ to the maximum limit, causing them to be in contact with the balls over an increased arc, will cause the ball carrier and the members $c^{20}$ and $f^{20}$ to rotate together, the balls then not rotating on their own axes, and, through the described connections, the shaft $f^{22}$ to rotate at the same speed and in the same direction as the shaft $a$ and the shaft $b^{24}$ to rotate at a 1:1 speed ratio with and in the same direction as the shaft $a$. In this condition each member $f^{20}$ and $c^{20}$ receives an equal amount of torque and thus turn together, carrying the bevel gears $f^{23}$ and $c^{25}$ with them to drive directly through the pins $b^{21}$. This action is similar to the draft force applied to a device by a whiffle tree when the forces at equal distances from the pivot point of the tree are equal.

In the construction shown in Figures 9 and 10 two single transmission devices, each for convenience being shown as the same in construction as that shown in Figure 1, and corresponding parts being identified by the same reference characters, are compounded in one structure and are combined with a torque responsive control, which acts to press the members $c$ and $f$ of each transmission more or less close together and therefore to shift the points of contact of the members $c$ and $f$ with the balls $e$, as previously described. In this construction the inner housing or shell $g^{30}$ is held from rotation in one direction by a ball clutch or one direction brake, as indicated at $g^{31}$, and disc $c^{32}$, which supports the yieldable concave member $c$, is splined to the shell $g^{30}$, as at $c^{33}$, so that they shall be held from rotation in one direction but shall be free to move in an axial direction to shift the points of contact of the concave members with the balls, it being understood that the concave member $f$ is carried by the disc $c^{34}$ which supports in a yielding manner the concave member $c$ of the second transmission device and that the disc $c^{34}$ has a running fit on the extension $a^{34}$ of the driving shaft $a$, to which extension the ball carrier $d^{34}$ is keyed, as at $d^{35}$. The ball carrier $d^{36}$ of the second transmission device is keyed at $d^{37}$ to the driven shaft $b^{38}$.

The outer part of the two-part shell or housing $g^{32}$, $g^{33}$, has a bearing at $g^{34}$ on the driven shaft $b^{38}$ and a bearing at $g^{35}$ on the driving shaft $a$.

To effect torque control of the transmission (and it will be understood that such torque control might be applied to a single transmission device by itself, as well as to one of the two compounded transmission devices) the driving shaft $a$ has a portion $a^{35}$ formed with a high pitch thread and on such portion is mounted an internally threaded sleeve $a^{36}$, on which the disc $c^{32}$ has a bearing at $c^{36}$. The sleeve $a^{36}$ is provided with a flange $a^{37}$ which carries spindles $a^{38}$ on which are pivoted centrifugal weights $a^{39}$. The latter are formed with gear segments $a^{40}$ which mesh with a gear $a^{41}$ formed on or secured to the shaft $a$. A coiled spring $a^{42}$ engaged with the shaft $a$, as at $a^{43}$, bears against a pin $a^{44}$ of a flange $a^{47}$, tending to throw the centrifugal weights $a^{39}$ toward the shaft axis. Under the influence of resistance to rotation of the driven shaft $b^{38}$, the spring $a^{42}$ throws the centrifugal weights $a^{39}$ toward the shaft axis, but as the speed increases, as by reason of decreased resistance or the application of increased driving power, the centrifugal weights move away from the shaft axis and thereby cause the sleeve $a^{36}$ to move axially in such a direction as to press the concave members $c$ toward the concave members $f$, and, by shifting the axis of rotation of the balls $e$, to increase the speed of the driven part to or toward a 1:1 ratio with the driving shaft. It will thus be seen that the drive takes place through the gear sectors, weights, etc., and that the input speed to the device remains constant, while the torque delivered varies to accommodate changes in load. If the load increases, the speed of the driven member decreases and its torque increases to meet the changed load conditions without changing the speed of the driving member.

Figure 12:
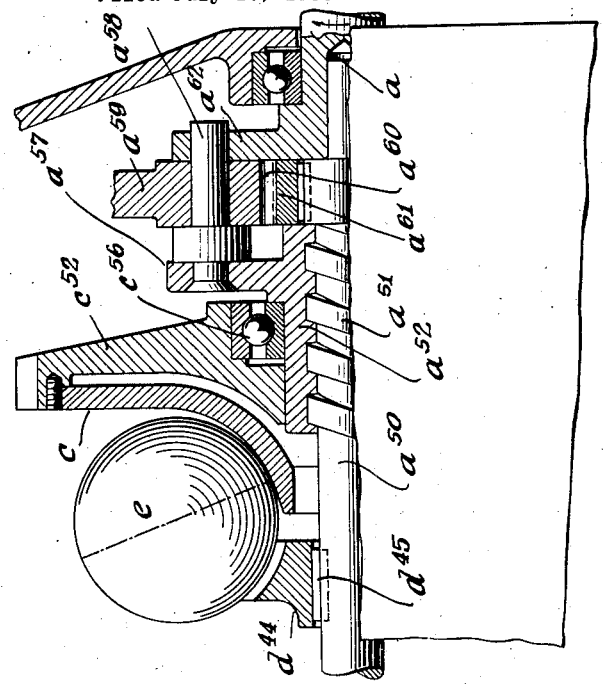
Figure 12 is a detail sectional view of a modified form of the torque control device shown in Figure 9.
Figure 11:
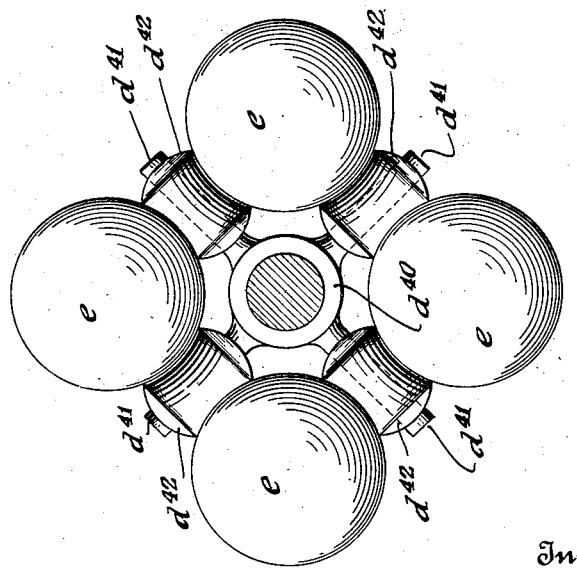
Figure 11 is a detail view of a modified form of ball carrier.

In the modification of the torque control device shown in Figure 12 the driving shaft $a$ receives with a running fit the reduced end of an intermediate shaft $a^{50}$ which is provided with a high pitch thread $a^{51}$ engaged by the internally threaded sleeve $a^{52}$, on which the disc $c^{52}$, which carries the concave member $c$, has a bearing at $c^{56}$, relative rotation of the intermediate shaft $a^{50}$ and the sleeve $a^{52}$ effecting movement of the concave member $c$ toward or away from the balls $e$. The sleeve $a^{52}$ is provided with a flange $a^{57}$ which carries spindles $a^{58}$ on which are pivoted the centrifugal weights, a portion of one of which is shown at $a^{59}$. The weights are formed as before with gear segments, as at $a^{60}$, which mesh with a gear $a^{61}$ formed on or secured to the intermediate shaft $a^{50}$. The spindles $a^{58}$ also engage a flange $a^{62}$ of the driving shaft $a$. Power supplied through the driving shaft $a$ is therefore applied to the studs or spindles $a^{58}$ and thence to the centrifugal weights from which power is supplied through the gear $a^{61}$ and the intermediate shaft $a^{50}$ to the ball carrier $d^{44}$ which is keyed to the intermediate shaft, as at $d^{45}$. Resistance to rotation of the intermediate shaft through the engagement of the centrifugal weights therewith compels the centrifugal weights to approach nearer to the axis of the driving shaft and, through the threaded engagement of the intermediate shaft $a^{50}$ and the sleeve $a^{52}$ effects adjustment of the transmission device for lower speed. Obviously the foregoing threaded engagement finds its equivalent in suitably mounted cams or other mechanism for effecting such adjustment. With this construction the speed of the driven shaft may vary while the speed of the driving shaft remains constant.

It will be understood that the primary invention disclosed in this case might find expression in still other embodiments than those shown and described and in various modifications of details of construction and arrangement made to suit different conditions of use and that the invention, therefore, is not restricted to the particular constructions shown and described herein except as pointed out in the accompanying claims.

I claim as my invention:

1. In a transmission device the combination of a driving shaft, a driven shaft, a ball carrier keyed to one of the shafts, a ball, two coaxial concave members with which the ball may have rolling contact at opposite sides, one of said members being deformable to shift the line of contact with the ball, one of said members being secured to the other shaft to rotate therewith, and means to hold the other of said members from rotation.

2. In a transmission device the combination of a driving shaft, a driven shaft, a ball carrier keyed to the driven shaft, a ball, two concave members with which the ball may have rolling contact at opposite sides, one of said members being yieldable to shift the line of contact with the ball, one of said members being secured to the driving shaft to rotate therewith, means to hold the other of said members from rotation, a housing having an interiorly threaded hub, and an exteriorly threaded sleeve to engage the threaded hub and operatively connected with the driving shaft to move one of said members toward the other.

3. In a power transmission device, the combination of a driving part, a driven part, a ball carrier and ball, two members with which the ball may have rolling contact at opposite sides, means to hold one of said members from rotation, means to connect the other of said members operatively with one of the first mentioned parts, means to connect the ball carrier operatively with the other of said parts, one of said members being yieldable to shift the line of contact with the ball, a torque responsive device, and means actuated by said torque responsive device to move one of said members toward the other.

4. In a power transmission device the combination of a driving shaft, a ball carrier secured thereto to rotate therewith, a ball, two relatively deformable members with which the ball may have rolling contact at opposite sides, means to hold one of said members from rotation, and a second shaft to which the other of said members is secured.

5. In a power transmission device the combination of a driving part, a driven part, a ball carrier and ball, two members with which the ball may have rolling contact at opposite sides, means to hold one of said members from rotation, means to connect the other of said members operatively with one of the first mentioned parts, means to connect the ball carrier operatively with the other of said parts, one of said members being yieldable to shift the line of contact with the ball, centrifugal devices mounted with the driving part to rotate therewith, and means actuated by said centrifugal devices to move one of said members toward the other.

6. In a power transmission device the combination of a driving part, a driven part, a ball carrier and ball, two members with which the balls may have rolling contact at opposite sides, means to hold one of said members from rotation, means to connect the other of said members operatively with one of the first mentioned parts, means to connect the ball carrier operatively with the other of said parts, one of said members being yieldable to shift the line of contact with the ball, centrifugal devices mounted with the driving part to rotate therewith, said driving part being screw threaded, an internally threaded sleeve mounted on the threaded portion of the driving part and supporting said centrifugal bodies, said threaded sleeve being in operative relation with one of said members to press the same toward the other.

7. In a power transmission device the combination of a driving part, a driven part, a ball carrier and ball, two concave members with which the ball may have rolling contact at opposite sides, means to hold one of said members from rotation, means to connect the other of said members operatively with one of the first mentioned parts, means to connect the ball carrier operatively with the other of said parts, one of said members being yieldable to shift the line of contact with the ball, centrifugal devices mounted with the driving part to rotate therewith, said driving part being screw threaded, and an internally threaded sleeve mounted on the threaded portion of the driving part and supporting said centrifugal bodies, said threaded sleeve being in operative relation with one of said members to press the same toward the other.

8. In a power transmission device the combination of a driving shaft, a driven shaft, a ball carrier secured to the driving shaft to rotate therewith and a ball carried thereby, a second ball carrier secured to the driven shaft to rotate therewith and the ball carried thereby, two relatively yieldable concave members with which the ball of the first ball carrier may have rolling contact at opposite sides, two relatively yieldable concave members with which the ball of the second carrier may have rolling contact at opposite sides, means to press one of each pair of members toward the other to shift the line of contact with the corresponding ball, means to hold one of the first pair of members from rotation, and means to hold one of the second pair of members from rotation, the other member of the first pair of concave members being operatively connected with the other member of the second pair so that said two members shall rotate together.

9. In a power transmission device the combination of a driving shaft, a driven shaft, a ball carrier secured to one of the shafts, a ball, two relatively deformable members with which the ball may have rolling contact at opposite sides, means to hold one of said members from rotation, means to secure the other of said members to the other of the shafts, and means to move one of said members axially.

This specification signed this 11th day of July A. D. 1930.

CARL W. WEISS.